June 5, 1956 R. BINDER ET AL 2,748,913
FRICTION CLUTCHES
Filed Aug. 13, 1952 2 Sheets-Sheet 1

INVENTORS:
RICHARD BINDER AND
ADOLF LUDWIG
BY:

June 5, 1956 R. BINDER ET AL 2,748,913
FRICTION CLUTCHES
Filed Aug. 13, 1952 2 Sheets-Sheet 2

INVENTORS:
RICHARD BINDER AND
ADOLF LUDWIG
BY:

United States Patent Office 2,748,913
Patented June 5, 1956

2,748,913

FRICTION CLUTCHES

Richard Binder and Adolf Ludwig, Schweinfurt (Main), Germany, assignors to Fichtel & Sachs A. G., Schweinfurt (Main), Germany, a German company Application August 13, 1952, Serial No. 304,088

Claims priority, application Germany October 3, 1951

3 Claims. (Cl. 192—105)

The invention relates to friction clutches of the kind in which engagement and disengagement are automatically effected by means of centrifugal weights in dependence upon the speed of the engine, and wherein the clutch can also be arbitrarily disengaged. As compared with the known types of construction of such clutches, the centrifugal clutch according to the invention has for its objects simplicity of construction, low overall depth not substantially exceeding that of clutches without automatic centrifugal weight control, and low cost of production.

According to the invention, in which the centrifugal weights act directly upon springs which, when the clutch is in the disengaged position, are under an initial tension, each centrifugal weight acts directly upon a group of springs through the medium of a cross-piece interconnecting said spring. The centrifugal weights may be so arranged in relation to the outer periphery of the clutch pressure plate that they are at least partly accommodated in recesses in the rim of the fly-wheel. A particularly space-saving form of construction which is of great importance in the clutches of automobile vehicles is obtained by replacing the annular element which is frequently provided to interconnect the springs by the aforesaid cross-piece, and by the arrangement of the centrifugal weights.

The movement of the centrifugal weights may be limited by the engagement of said weights with the outer peripheral face of the pressure plate in the disengaged position of the clutch, while the inner peripheral face of the fly-wheel or the recesses therein may serve to limit outward movement of the centrifugal weights in the engaged position of the clutch. The centrifugal weights may be guided in radial recesses provided in a clutch cover plate.

The clutch springs may be surrounded by cups, two or more of which are interconnected by a cross-piece. Each cross-piece may be provided with a knife-edge to which the pressure of one centrifugal weight is transmitted by a pivoted lever arm, said arm being preferably formed with a groove for the reception of the knife edge. The arcuate path of movement of the groove about the fulcrum of the lever arm is rendered possible by the elastic deformation of the springs.

The speed of the engine at which the engagement of the clutch is effected can be determined by the adjustment of the tension of springs drawing the pressure plate away from the clutch disc.

A constructional form of clutch according to the invention is illustrated by way of example in the accompanying drawings, wherein.

Figure 1:
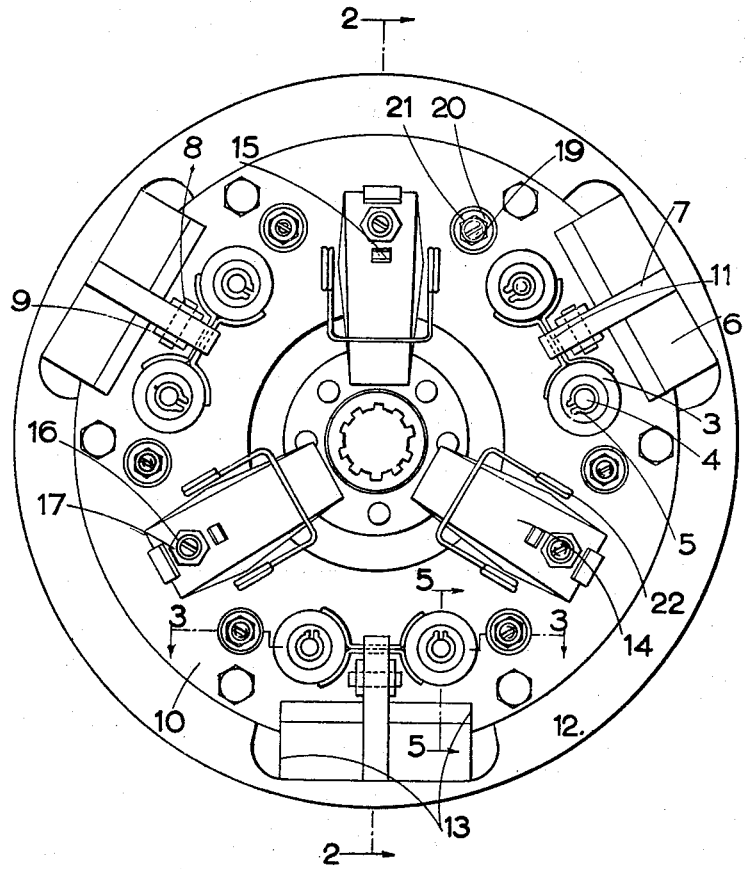
Figure 1 shows the clutch in face elevation.
Figure 3:
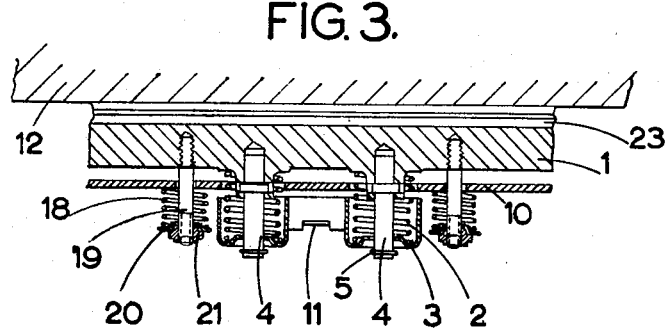
Figure 3 is a detail section on line G—H of Figure 1.

The springs 2 which act upon the pressure plate 1, are held at their outer ends in cups 3 (Figure 5) and are maintained under initial compression by pins 4 secured to the pressure plate, the inner rims of said cups bearing against abutments 5 carried by the pins. The axial length of the springs 2 when under compression is such that, if the clutch lining is worn, the cups 3 will just make contact with the abutments 5 when the clutch is engaged. The centrifugal weights 6 are carried by levers 7 (Figures 2 and 4) pivoted on pins 8 which are mounted in brackets 9 secured to the clutch housing 10. Movement of the centrifugal weights 6 is limited inwardly by the outer peripheral surface of the pressure plate 1, and outwardly by the inner peripheral surface of the rim of the fly-wheel 12.

The inner, shorter arm of each lever 7 is arranged to act on the springs 2 through the medium of a cross-piece 11 by which two cups 3 are rigidly interconnected. The centrifugal weights 6 are guided in the radial direction in recesses 13 provided in the clutch housing 10, so that the peripheral forces set up as the engine speed is raised or reduced are taken up directly by the centrifugal weights, and cannot act upon the pivot pins 8 of the centrifugal weights. The clutch is provided with the usual lever system consisting, for example, of three levers 14 pressed from sheet steel, which are mounted on angular bearing members 15 formed in the manner of knife-edges, and are connected to the pressure plate by bolts 16 and nuts 17. Hairpin springs 22 hold the lever system under tension.

Automatic disengagement of the clutch is effected by means of an annular series of helical springs 18 which are compressed between the clutch housing 10 and pressure discs 20 attached by means of nuts 21 to pins 19 which in turn are secured to the pressure plate.

The operation of the clutch is as follows:

In the inoperative condition and at low engine speeds, the pressure plate 1 is drawn away from the clutch disc under the action of the compressed puller springs 18, until the centrifugal weights 6 are engaged against the outer peripheral face of the pressure plate 1. In this position, the clutch is disengaged.

Figure 4:
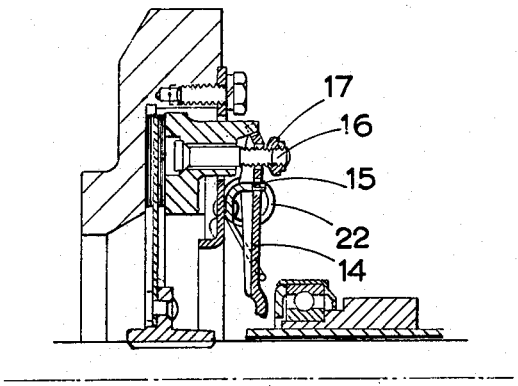
Figure 4 is a detail section similar to the lower part of Figure 2 but showing the centrifugal weight in the position corresponding to the disengaged position of the clutch.
Figure 4:
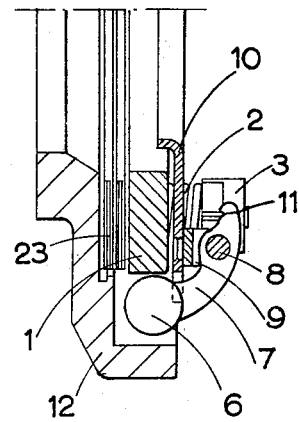
Figure 2:
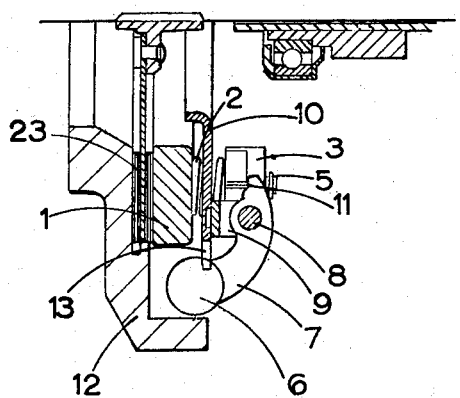
Figure 2 is a cross-sectional view on line A—B of Figure 1 showing one of the centrifugal weights in the position corresponding to the engaged position of the clutch.
Figure 5:
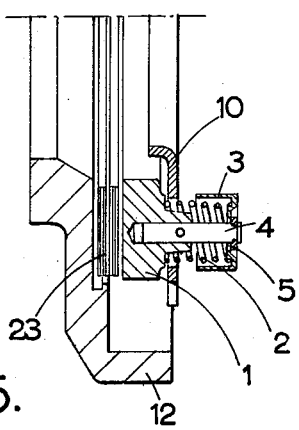
Figure 5 is a detail section on line E—F of Figure 1.

When the speed of the engine is increased, the puller springs 18 can hold the pressure plate in the disengaged position only as long as the forces exerted by the centrifugal weights on the cross-pieces 11 do not overcome the compression force of said springs. As soon as the speed reaches a value at which the pressure exerted by the centrifugal weights on the cross-pieces 11 reaches, and then exceeds, the pressure of the springs 18, the pressure plate is first pressed against the clutch disc 23. At this moment the engagement of the clutch commences. As the speed of rotation continues to increase the springs 2 are further compressed, until the centrifugal weights abut against the fly-wheel, as shown in Figure 2. When the speed of rotation decreases, the reverse movements occur. As soon as the pressure of the centrifugal weights on the cross-piece 11 has fallen to a value less than that produced by the springs 18, the pressure plate is again withdrawn as shown in Figure 4.

Disengagement of the clutch at relatively high speeds of rotation can be effected in the usual manner by the application of pressure to the levers 14, the pressure plate 1 being then drawn away from the clutch disc 23 by the rocking movement of said levers and the bolts 16 and nuts 17 about the knife-edge mountings 15, the clutch springs 2 being further compressed. The position of the centrifugal weights does not change when disengagement is thus effected by means of the levers. The pressure exerted on the clutch disc remains constant above a predetermined speed of rotation, namely from that speed of rotation at which the centrifugal weights 6 abut against the fly-wheel. The further increase in the centrifugal force produced by the centrifugal weights does not cause any change in the clutch, but merely causes an increase in the pressure exerted by the centrifugal weight 6 upon the fly-wheel 12.

In order to obtain sensitive operation of the clutch it is important that the centrifugal weights shall have the minimum possible friction both at their pivots 8 and especially at their points of engagement with the cross-pieces 11. The cross-pieces are therefore formed as knife edges with which the inner arms of the levers 7 engage through the medium of recesses in said levers adapted to the shape of the knife edges, the recess in the inner end of each lever describing an arc about the axis 8. In order to prevent sliding friction at the cross-pieces 11, the performance of the arcuate movement with only minimum resistance is rendered possible by reason of the fact that the spring cups 3 connected to the cross-pieces 11 adapt themselves to the knife-edge connections of the centrifugal weight levers 7 with elastic deformation of the shape of the springs 2.

In the embodiment illustrated, two spring cups are interconnected by one cross-piece 11. It is readily possible to combine a larger number, for example four springs, in a group, and to connect them by one cross-piece on which the centrifugal weights act.

What we claim is:

1. In a centrifugal clutch, coaxial driving and driven members, a housing secured to said driving member, an axially movable pressure plate mounted within said housing to rotate therewith, a friction disc connected to said driven member and positioned between said driving member and said pressure plate, means resiliently retracting said pressure plate from said friction disc, groups of compression springs engaging the pressure plate to urge said plate in the direction to engage the friction disc between the driving member and said pressure plate, cups enclosing the free ends of the springs, a cross-piece extending between and interconnecting the cups corresponding to each group of springs and being provided with a knife edge, and weighted centrifugal force-responsive levers pivotally mounted on said housing and each engaging the knife edge of one of the cross-pieces thereby to compress the springs in opposition to said retracting means and so move said pressure plate to engage the friction disc between the driving member and said plate upon the development of a predetermined centrifugal force in said levers.

2. In a centrifugal clutch, coaxial driving and driven members, a housing secured to said driving member, an axially movable pressure plate mounted within said housing to rotate therewith, a friction disc connected to said driven member and positioned between said driving member and said pressure plate, means resiliently retracting said pressure plate from said friction disc, groups of compression springs engaging the pressure plate to urge said plate in the direction to engage the friction disc between the driving member and said pressure plate, cups enclosing the free ends of the springs, a cross-piece extending between and interconnecting the cups corresponding to each group of springs, and weighted centrifugal force-responsive levers mounted on said housing for pivotal movement in planes extending radially of the clutch axis and guided in radial recesses in said housing, thereby to compress the springs in opposition to said declutching means and so move said pressure plate to engage the friction disc between the driving member and said plate upon the development of a predetermined centrifugal force in said levers, movement of said weighted levers in the clutch-engaging direction being limited by the abutment of the weights with a rim of the driving member, and movement of said levers in the clutch-disengaging direction being limited by the abutment of said weights with the pressure plate.

3. In a centrifugal clutch, coaxial driving and driven members, a housing secured to said driving member, an axially movable pressure plate mounted within said housing to rotate therewith, a friction disc connected to said driven member and positioned between said driving member and said pressure plate, retracting springs urging said pressure plate away from said friction disc, groups of compression springs engaging the pressure plate to urge said plate in the direction to engage the friction disc between the driving member and said pressure plate, cups enclosing the free ends of the springs, a cross-piece extending between and interconnecting the cups corresponding to each group of compression springs, weighted centrifugal force-responsive levers pivotally mounted on said housing thereby to compress the compression springs in opposition to said retracting springs and so move said pressure plate to engage the friction disc between the driving member and said plate upon the development of a predetermined centrifugal force in said levers, and means to adjust the force of said retracting springs on the pressure plate thereby to vary the rotary speed at which the centrifugal force-responsive levers effect engagement of the clutch.

References Cited in the file of this patent

UNITED STATES PATENTS

| | | |
|---|---|---|
| 2,253,294 | Higgs | Aug. 19, 1941 |
| 2,239,568 | Newton | Apr. 22, 1941 |

FOREIGN PATENTS

| | | |
|---|---|---|
| 436,747 | Great Britain | Oct. 17, 1935 |
| 378,316 | Italy | Oct. 16, 1939 |
| 496,682 | Great Britain | Dec. 5, 1938 |
| 546,795 | Great Britain | July 30, 1942 |